INVENTOR.
DIETER MAAS

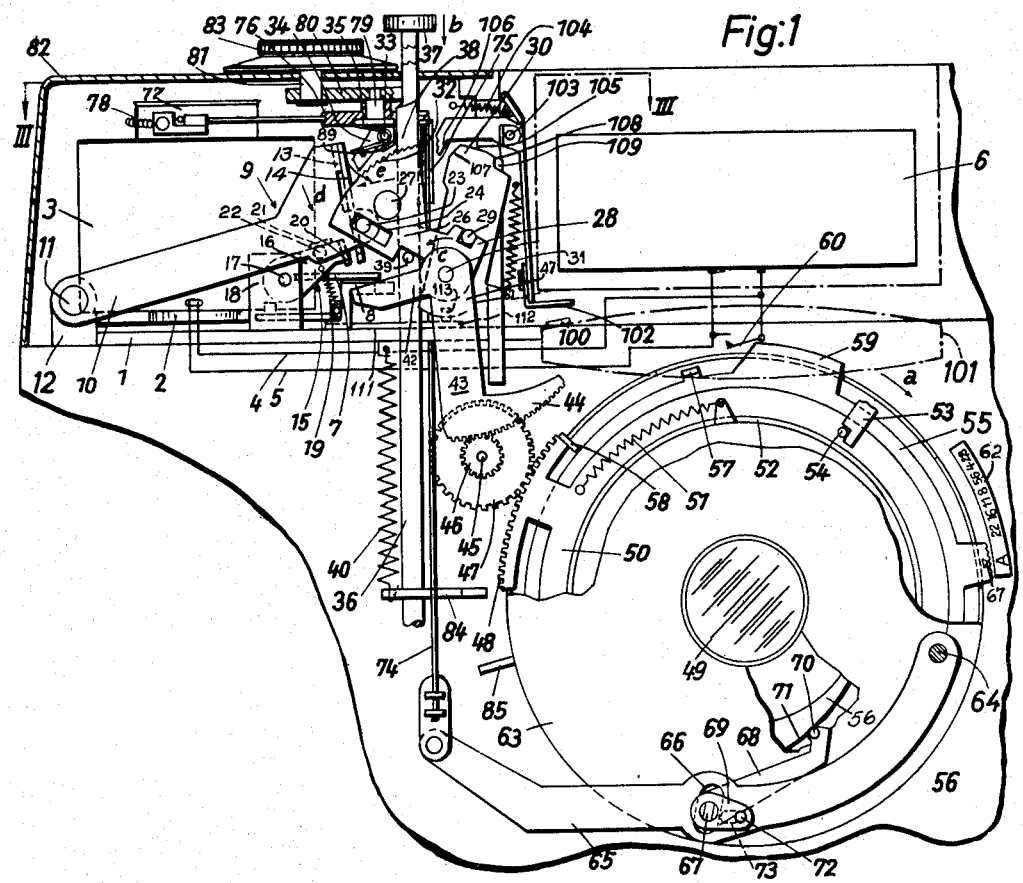

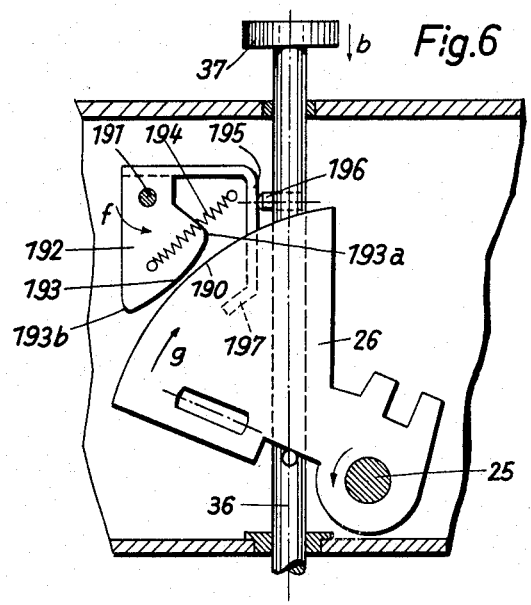
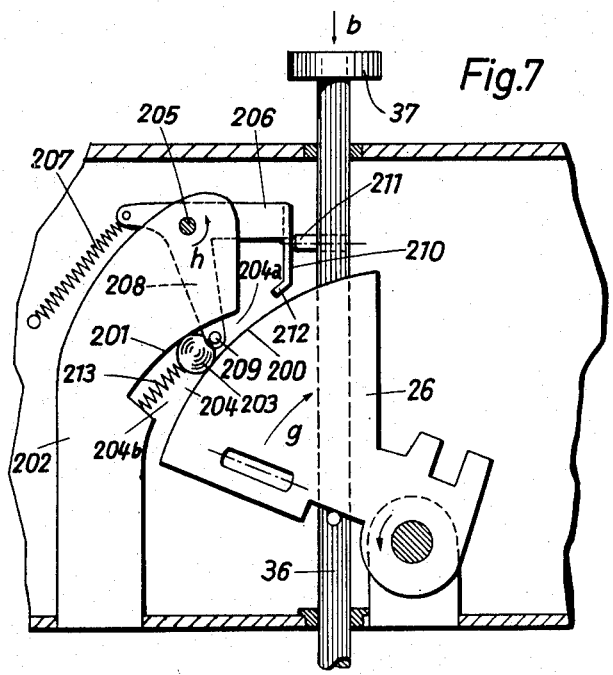

March 31, 1964  D. MAAS  3,126,800
AUTOMATIC CAMERA WITH SCANNING

Filed Sept. 14, 1961  5 Sheets-Sheet 5

INVENTOR.
DIETER MAAS
BY
Michael S. Striker

United States Patent Office 3,126,800
Patented Mar. 31, 1964

3,126,800
AUTOMATIC CAMERA WITH SCANNING
Dieter Maas, Munich, Germany, assignor to Agfa Aktiengesellschaft in Leverkusen-Bayerwerk, Munich, Germany
Filed Sept. 14, 1961, Ser. No. 138,052
Claims priority, application Germany Sept. 23, 1960
34 Claims. (Cl. 95—10)

The present invention relates to cameras.

More particularly, the present invention relates to cameras which are at least partly automatic in that at least one of the settings of the camera can be made automatically in accordance with the lighting conditions.

As is well known, in cameras of this type the automatic structure is controlled by a scanning arrangement which cooperates with a pointer of a light meter so as as actuate the automatic structure according to the lighting conditions. The scanning structure is driven by a spring, and this spring must be powerful enough not only to operate the scanning structure but also to operate the structure which automatically sets the camera. As a result a relatively powerful spring moves the scanning means into engagement with the pointer of the light meter, and a serious problem resides in protecting the light meter against the unavoidable stresses resulting from impact between the scanning structure and the light meter pointer. Furthermore, it is highly desirable to be able to provide a camera of this type which, at the option of the operator, may be operated in a fully manual manner, and in conventional cameras there is the problem of guaranteeing that the operator does not manually set the camera in a manner which will conflict with the automatic setting structure of the camera.

There is, in addition, a further problem present in conventional cameras of this type. Thus, where a camera is fully automatic it is a relatively simple matter to indicate to the operator when a proper exposure can be made. However, with cameras which are not fully automatic in that they require the operator to make a selection of the exposure time or the exposure aperture, for example, before the automatic structure is set into operation, it is a difficult matter to indicate to the operator when a proper exposure can be made and when the lighting conditions are such that the camera cannot make a proper exposure.

One of the objects of the present invention is to provide a camera of the above type which will in no way stress the light meter by undesirable impact between the scanning structure and the pointer of the light meter.

Another object of the present invention is to provide a camera of the above type which can be operated either manually or at least partly in an automatic manner, without requiring the operator to lock or unlock any parts of the camera, so that it is possible to operate the camera either in an at least partly automatic manner or in a fully manual manner without any possibility of conflict between the automatic and manual structures of the camera.

A further object of the present invention is to provide a camera which will indicate to the operator when a proper exposure can be made even if the camera is of the type where part of the settings are made manually and part of the settings are made automatically.

An additional object of the present invention is to provide an at least partly auotomatic camera which, if desired, can be operated in a fully manual and which at the same time is so highly fool-proof that proper photographs can be made very readily and easily by the most inexperienced amateur.

It is furthermore an object of the present invention to provide a structure capable of accomplishing all of the above objects and at the same time composed of simple rugged elements which are very reliable in operation and which provide an extremely compact assembly.

With these objects in view the invention includes, in a camera, a rotary light meter having a movable pointer, and three setting means for setting into the camera the film speed, the exposure aperture, and the exposure time. One of these setting means is automatic while the other two are manual, and the two manual setting means cooperate with the rotary light meter to position the latter angularly in accordance with the settings of the two manual setting means. A scanning means cooperates with the light meter to scan the pointer thereof, and of course the extent of movement of the scanning means will be determined in part by the positioning of the light meter in its entirety by the two manual setting means. This scanning means is movable from a predetermined rest position and carries a first stop means which is thus positioned by the scanning means in accordance with the lighting conditions. The automatic setting means is driven by a drive means from one end position to another end position, and this drive means drives a second stop means into engagement with the first stop means so that the first and second stop means cooperate with each other to determine the extent to which the drive means drives the automatic setting means, in accordance with the lighting conditions. An indicating means is provided for indicating to the operator when a proper exposure can be made, and this indicating means is actuated by the scanning means in accordance with the lighting conditions. An adjusting means is provided to adjust the indicating means, and this adjustment means is actuated by the turning of the light meter, when this light meter is turned by the two manual setting means, so that in this way the indicating means is influenced in accordance with the settings of the pair of manual setting means to indicate when a proper exposure can be made.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary partly schematic illustration of one possible embodiment of a structure according to the present invention;

FIG. 2 illustrates the cooperation between the scanning means and the light meter of the present invention;

FIG. 6 is a fragmentary elevation illustrating another embodiment of a structure for releasably holding the scanning means in engagement with the pointer of the light meter;

FIG. 7 is a fragmentary elevation illustrating still another embodiment of a holding means for holding the scanning means releasably in engagement with the pointer of the light meter.

Figure 3:
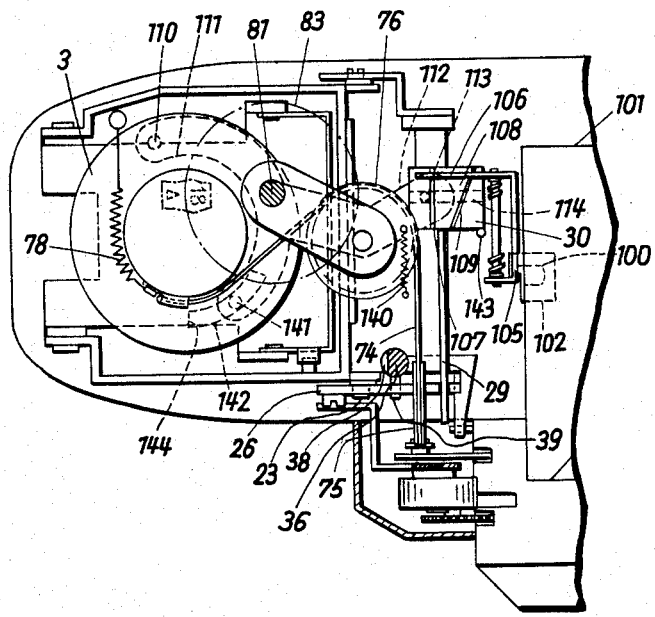
FIG. 3 is a fragmentary plan view taken along line III—III of FIG. 1 in the direction of the arrow.

Referring now to FIG. 1, there is shown therein a stationary plate 1 which carries a bearing 2 which supports the light meter 3 for rotary movement about its axis. The light meter 3 is electrically connected through the electrical conductors 4 and 5 with a photosensitive element such as, for example, the photocell 6 diagrammatically illustrated in the drawing. Moreover, the light meter 3 has a movable pointer 7 which is adapted to move freely in a horizontal plane, as viewed in FIG. 1, and the free end of the pointer 7 is freely movable over a stationary support member 8 which is fixedly carried by the plate 1 beneath the pointer 7. This support member 8 has an upper supporting surface located in a plane closely adjacent to and parallel to the plane in which the pointer 7 moves, and thus the pointer 7 can only be deflected in a downward direction, as viewed in FIG. 1, through a relatively small, negligible distance into engagement with the upper supporting surface of the support member 8.

A scanning means is provided to cooperate with the pointer 7, and this scaning means includes a substantially U-shaped member 9 having a pair of opposed parallel coextensive legs 10 which are pivotally suported by a pair of coaxial pivots 11 respectively carried by a pair of upstanding lugs 12 of the plate 1. The pair of legs 10 of the U-shaped member 9 are interconnected at their ends distant from the pivots 11 by a third leg 13 of the U-shaped member 9, this leg 13 being shown most clearly in FIG. 2. Also, as is apparent from FIG. 2, it is the leg 13 which is formed with the scanning edge which forms part of the scanning portion 14 located over the support member 8.

A holding means is provided for holding the pointer 7 against the supporting surface of the support member 8 just prior to engagement of the pointer by the scanning edge, and this holding means is indicated in its entirety at 15. This holding means 15 is also in the form of a substantially U-shaped member, and the holding means 15 has a pair of spaced parallel coextensive legs 16 pivotally carried by a pair of coaxial pivots 17 which are carried by a pair of upstanding lugs 18 of the plate 1, respectively. A spring 19 forms part of the holding means and is conected at one end to the plate 1 and at its opposite end to the U-shaped member 15 for urging the latter downwardly toward the pointer 7, this member 15 having distant from the pivots 17 a third leg interconnecting the legs 16 and extending across the pointer 7. Thus, when the U-shaped member 15 is released to the spring 19, this spring 19 will move the U-shaped member 15 about the pivots 17 to place the third leg of the U-shaped member in engagement with the pointer 7 to hold the latter against the support member 8. The movement of the U-shaped member 15 is controlled by the scanning means itself. Thus, the U-shaped member 9 fixedly carries a pin 22 located beneath a lug 21 fixed to and extending from one of the legs 16. Thus, the spring 19 can only hold the lug 21 against the pin 22 as long as the scanning means is in the rest position thereof shown in FIG. 1, and thus in this position the pointer 7 is free to take whatever positions are called for by the lighting conditions. The third leg of the holding means is indicated at 20.

The scanning means includes, in addition to the U-shaped member 9, a lever 26 which is turnable about a stationary pivot 25 fixedly mounted in the camera, and this lever 26 has a pin-and-slot connection 23, 24 with the U-shaped member 9. This lever 26 of the scanning means carries a stop means in the form of a stop pin 27 which is fixed to the lever 26 for turning movement therewith about the pivot 25. Moreover, the lever 26 has a bifurcated portion 28 receiving a pin 39 which is fixed to a lever 30 which is also turnable about the stationary pivot 25, so that the lever 30 is constrained to turn with the lever 26. This lever 30 also forms part of the scanning means, and an extension of the lever 30 is connected to one end of a spring 31 whose opposite, upper end as viewed in FIG. 1, is connected to a stationary part of the camera, so that the spring 31 serves as a drive for the scanning means and moves the latter from the rest position shown in FIG. 1 to a position where the scanning edge of the scanning means engages the pointer 7 of the light meter.

A holding means is provided for releasably holding the scanning means in the position where it engages the pointer of the light meter, and in the embodiment of FIG. 1 this holding means includes a portion of the lever 26 which is formed with the ratchet teeth 32. A lever of the holding means cooperates with the edge of lever 26 which is provided with the teeth 32, and this lever in the embodiment of FIG. 1 takes the form of a pawl 34 supported for turning movement about a stationary pivot 33 and urged by the spring 35 to turn toward the teeth 32. The spring 35 is in the form of a wire spring partly coiled about the pivot 33, engaging with one end a pin which is carried by the pawl 34 and pressing with its other end against a stationary surface of the camera. Thus, when the pawl 34 engages the teeth 32 the lever 26 will not be able to turn in a clockwise direction, as viewed in FIG. 1, and the scanning means will be releasably held in a position engaging the pointer of the light meter, as will be apparent from the description which follows.

A manually operable release means is provided for releasing the scanning means for operation, and this manually operable release means includes an elongated rod 36 guided by suitable bearings for longitudinal movement and extending to the exterior of the upper part of the camera where the rod 36 carries a knob 37 adapted to be engaged by the operator. The rod 36 is urged upwardly to its rest position indicated in FIG. 1 by a return spring 40 connected at one end to a plate 84 which is fixedly carried by the rod 36 and at its opposite end to a stationary part of the camera. The spring 40 is stronger than the total of the forces of the springs 19 and 31, and the rod 36 carries a pin 39 which extends beneath the lower edge of the lever 26 so that when the operator does not depress the rod 36 the spring 40 overcomes the springs 31 and 19 and by way of the pin 39 and lever 26 places the scanning means in the rest position shown in FIG. 1 where the springs 19 and 31 are of course under tension. The rod 36 fixedly carries an elongated portion 38 which extends to the left, as viewed in FIG. 1, beyond the left edge of the rod 36, and this projecting portion 38 cooperates with a projecting portion 89 of the lever or pawl 34 for maintaining the lever or pawl 34 in opposition to the spring 35 in the position shown in FIG. 1 away from the teeth 32. The length of the projecting portion 38 is such that after the scanning means engages the light meter pointer and the pin 39 moves downwardly beyond the lever 26 the pawl 34 will be released to the spring 35 so as to engage the teeth 32, and of course during the return movement of the rod 36 the portion 38 will engage the projecting portion 89 of the lever 34 to turn the latter away from the teeth 32 just prior to engagement of the pin 39 with the lever 26. It wil be noted that with this construction when the pawl 34 engages the teeth 32, this structure serves a releasable holding means holding the scanning means against upward movement back toward the rest position thereof indicated in FIG. 1.

The pivot 25 which supports the levers 26 and 30 for rotary movemenht also supports a bellcrank lever 41 for rotary movement, and this lever 41 has an arm 42 which forms a second stop means which is adapted to cooperate with the stop means formed by the pin 27. Thus, when the scanning means engages the pointer of the light meter the stop means 27 will have a position determined by the lighting conditions, and then a drive means described below turns the lever 41 in a clockwise direction, as viewed in FIG. 1, until the stop means 42 engages the stop means 27, so that in this way the extent to which the drive means operates is determined. The other arm 43 of the lever 41 has a gear sector portion 44 which meshes with a pinion 46 supported for rotation by any suitable stationary shaft 45 and fixed coaxially to a gear 47 which in turn meshes with a gear sector portion 48 which extends along an arc of a circle which is concentric with the optical axis of the objective 49 of the camera. The gear sector 48 is integrally connected with the diaphragm controlling ring 50 in the particular example illustrated in the drawing.

This gear transmission 44–48 forms part of the drive means for driving the stop means 42, and this drive means also includes a driving spring 51 one end of which is fixed to a stationary ring 52 while the other end is connected to a pin which is fixed to the ring 50. The spring 51 when tensioned urges the ring 50 to turn from an initial end position of the diaphragm toward an opposite final end position thereof, and this diaphragm of course forms a setting means for setting at least part of the structure of the camera for determining the exposure made thereby. In the illustrated example, when the spring 51 is fully tensioned the diaphragm ring 50 places the diaphragm in that end position where the largest exposure aperture is provided, while the spring 51 always seeks to turn the ring 50 toward the end position where the smallest exposure aperture is provided. In order to place and releasably hold the ring 50 in the position where the largest exposure aperture is provided and the spring 51 is fully tensioned, the ring 50 fixedly carries a pin 54 engaged by a lug 53 of a well known cocking ring which may, for example, also be used to cock the shutter. When an exposure is to be made the lug 53 moves away from the pin 54 so as to release the ring 50 to the driving spring 51. The ring 50 may itself carry pins which cooperate with the blades of the diaphragm, or the ring 50 may be connected to a second ring which carries pins which cooperate with the diaphragm blades in a well known manner.

Concentrically arranged with respect to the optical axis are a ring 55 for manually setting the diaphragm or for setting the camera for at least partly automatic operation, and a ring 56 for setting the exposure time. The rotary exposure time setting ring 56 is connected in an unillustarted manner with an unillustrated manually engageable member enabling the operator to turn the ring 56. The ring 55 carries a stop portion 57 which forms a third stop means, in addition to the pair of stop means 27 and 42, for a purpose described below. When the operator turns the ring 55 to manually determine the size of the exposure aperture, the distance of the stop means 57 from a projection 58 fixedly carried by the toothed portion 48 is regulated, and the stop means 57 is located in the path of movement of the projection 58. The ring 55 also carries a switch-controlling cam 59 which cooperates with a switch 60. The switch 60 is located between the conductors 4 and 5 and serve to short circuit the photocell 6 when the switch 60 is closed by the cam 59. The ring 55 carries an index 61 which cooperates with a stationary scale 62 carried by the camera, this scale 62 being shown in a plane of FIG. 1 only for the sake of clarity and actually being located along a cylinder whose axis coincides with the optical axis. It will be noted that the scale 62 includes not only graduations indicating settings of the diaphragm but also the symbol A indicating the setting of the ring 55 for automatic operation.

The shutter housing includes a stationary plate 63 which fixedly carries a pivot pin 64, and the pivot pin 64 supports the lever 65, shown in FIG. 1, for turning movement. Intermediate its ends the lever 65 is formed with elongated slot 66 through which freely extends a pin 67 supported for rotary movement by unillustrated bearings and fixedly carrying a pair of levers 68 and 69. The lever 68 fixedly carries distant from the rotary pin 67 a pin 70 engaged by the camming edge 71 of the exposure time setting ring 56, so that the lever 68 will turn to angular positions in accordance with the exposure time set into the camera, and a spring 78 serves in a manner described below to maintain the pin 70 in engagement with the camming edge 71. Th lever 69 also fixedly carries a pin 72, and this pin 72 extends into an elongated slot 73 formed in the lever 65. Thus, turning of the lever 68 by turning of the ring 56 will result in turning of the lever 65 to angular positions indicative of the exposure time set into the camera.

At its end distant from the pivot 64, the lever 65 is fixedly connected to an elongated flexible cable, cord, or the like 74, which is substantially unstretchable, and this cord or cable 74 is guided over a pulley means to the light meter 3. Thus, this pulley means includes a first pulley 75 supported for free rotary movement by a stationary pin and a second pulley 76 which receives the cable 74 from the pulley 75 and guides the cable around to the light meter 3 to which the other end of the cable 74 is connected. It will be noted that the pulley 76 of the pulley means is in a horizontal plane while the pulley 75 is in a vertical plane. This structure is also shown in FIG. 3. The portion of the light meter 3 to which the cable 74 is connected takes the form of a take-up pulley 77 which is fixed to the light meter 3 for rotary movement therewith and which acts as a spool to wind the cable around the axis of the light meter 3. An elongated spring 78 is fixed at one end to the spool 77 and at its opposite end to a stationary part of the camera, and this spring 78 urges the light meter 3 to turn in a clockwise direction, as viewed in FIG. 3, and in this way the cable 74 is always maintained under tension, and it will be seen that the spring 78 acts through the cable on the lever 65 to urge the latter to turn in a direction which maintains the pin 70 in engagement with the camming edge 71. Thus, whenever the operator sets the exposure time, the light meter 3 is turned to an angular position which will influence the automatic structure in accordance with the exposure time set into the camera.

The angular position of the light meter 3 is also regulated in accordance with the speed of the film which is used in the camera, and for this purpose the operator manually turns the knob 83 which is accessible at the upper part of the camera. This knob 83 is fixed to a pin 81 which extends through the top wall 82 of the camera and which is supported for rotary movement about its axis, and the pin 81 fixedly carries a lever 80 which in turn fixedly carries a pin 79 on which the pulley 76 is supported for free rotary movement. Thus, when the operator turns the knob 83 to an angular position determined by the speed of the film which is set into the camera, the pulley 76 will be moved around the axis of the knob 83 to act on the cable 74 so as to adjust the angular position of the meter 3 in accordance with the film speed. The knob 83 may carry at its periphery a scale of film speeds cooperating with an index on the upper part of the camera next to the periphery of the knob 83, and one of the film speed graduations is shown in alignment with such an index in dash-dot lines in FIG. 3. Of course, the scale of film speeds may be arranged on the top wall 82 along the periphery of the knob 83 which in this case may carry an index to cooperate with the scale of film speeds.

With the particular embodiment of the invention described above and shown in the drawing where the diaphragm in its one end position where the spring 51 is tensioned has the largest exposure aperture, the light meter 3 is so arranged with respect to the scanning portion 14 of the scanning means that when there is a relatively large amount of light available the pointer 7 of the meter is located in alignment with the region 14a of the scanning edge (FIG. 2), this region 14a being located relatively close to the support member 8, while when a relatively small amount of light is available the pointer 7 will be located in the region 14b of the scanning edge, this region 14b being located at a relatively great distance from the support 8. The result is that the extent to which the scanning means moves from its rest position varies inversely with the amount of light. Thus, when there is a large amount of light available the scanning means will move through only a relatively short distance before the scanning edge engages the pointer 7, while when a relatively small amount of light is available the scanning means will move through a relatively large distance. The result is that the stop means 27 will move from its rest position shown in FIG. 1 through a relatively short distance when there is a large amount of light available and through a relatively large distance when there is a small amount of light available. Since the stop means 27 will move through only a relatively short distance from its rest position when a large amount of light is available, the drive means connected to the diaphragm-setting ring 50 will turn this ring through a relatively large distance before the stop means 42 engages the stop means 27, while on the other hand when a small amount of light is available the stop means 27 will be located much closer to the stop means 42 and the drive means which drives the stop means 42 and the ring 50 will only turn these elements through a relatively short distance before the stop means 42 engages the stop means 27. When the ring 55 is turned by the operator to set the diaphragm manually, the cam 59 of course closes the switch 60 so that the photocell 6 is short circuited, and at this time the meter 3 receives no current and the pointer 7 becomes located beneath the portion 14c (FIG. 2) of the scanning portion 14. Thus, when the operator depresses the plunger 36 when the camera is set for fully manual operation, the location of the pointer 7 beneath the portion 14c of the scanning means will limit the movement of the scanning means from its rest position by the spring 31 to such an extremely small distance that the stop means 27 will never move close enough to the stop means 42 to be engaged by the latter irrespective of the manual setting of the diaphragm, and thus there is no possibility of conflict between the manual and automatic structure.

Before making any exposure with the camera of the invention, the operator will of course first turn the knob 83 to the position corresponding to the speed of the film which is in the camera, and in this way the pulley 76 will be turned about the axis of the knob 83 so as to set the angular position of the meter 3 accordingly, as described above. With the particular camera shown in the drawing and described above, before making an exposure the operator will make a selection of a particular exposure time, and the operator will in this way manually determine the angular position of the ring 56. This will of course result, in the manner described above, in turning of the lever 65 and movement of the cable 74 so that the angular position of the meter 3 is also set in accordance with the exposure time set into the camera.

Assuming that the diaphragm is to be set automatically, then the operator has of course placed the index 61 in alignment with the symbol A of the scale 62, as indicated in FIG. 1. Thus after making a pre-selection of the exposure time, and assuming that the index 61 is aligned with the symbol A, the operator need only engage the knob 37 and depress the rod 36. This will of course result in downward movement of the pin 39, and the spring 31 will cause the lever 26 to follow the pin 39. It will be noted that the speed with which the scanning means moves from its rest position is determined by the speed with which the operator moves the rod 36 downwardly, so that with the structure of the invention the scanning means is not simply released to the spring 31 which can freely turn the scanning means with considerable impact into engagement with the pointer of the light meter. Thus, during downward movement of the rod 36 in the direction of the arrow b of FIG. 1 the spring 31 turns the lever 26 in the direction of the arrow c. Because of the pin-and-slot connection 23 and 24 between the lever 26 and the U-shaped member 9, this latter member is turned about the coaxial pivots 11 in the direction of the arrow d, and the spring 19 causes the U-shaped member 15 to follow the movement of the member 9 by maintaining the lug 21 in engagement with the pin 22. This continues until the edge of the transverse leg 20 of the holding means 15 engages the pointer 7 so as to preliminarily deflect this pointer through the extremely slight distance required to place it in engagement with the upper surface of the support 8. This operation takes place before the scanning edge of the scanning means engages the pointer 7, so that at the moment when the scanning edge engages the pointer 7, this pointer is already in engagement with the support 8. The continued movement of the scanning means from its position cannot now be followed by the holding means 15 so that the pin 22 now moves downwardly away from the lug 21. The movement of the scanning means will continue until the scanning edge of the scanning portion 14 engages the light meter pointer 7.

The operator will continue the downward movement of the rod 36, and as the rod 36 approaches the end of its downward movement the projecting portion 38 of the rod 36 moves away from the projecting portion 89 of the lever or pawl 34, so that the spring 35 now turns this pawl into engagement with the teeth 32, so that at this time the releasable holding means 32, 34 releasably holds the scanning means in the position where it engages the pointer of the light meter and where the stop means 27 is of course in a position determined by the lighting conditions as well as by the speed of the film and the exposure time set into the camera. Thus, at this time the releasable holding means 32, 34 serves to prevent movement of the lever 26 in a direction opposite to that indicated by the arrow c. Immediately after the rod 36 has moved downwardly through a distance sufficient to locate the projecting portion 38 beyond the projecting portion 89, the plate 84 fixedly carried by the rod 36 engages the shutter release member 85 to actuate this member to release the shutter. The shutter operates in such a way that when the element 85 is moved by the plate 84, the ring which carries the lug 53 first returns to its rest position in the direction of the arrow a shown in FIG. 1, and then the shutter is fully opened. Of course, the turning of the projection or lug 53 in the direction of the arrow a is followed by the pin 54 so that before the shutter is fully opened the spring 51 contracts and the drive means operates on the one hand to turn the ring 50 so as to set the exposure aperture and on the other hand to turn the stop means 42 toward the stop means 27. The drive means will of course continue to operate until the stop means 42 engages the stop means 27, and then the drive means will be unable to operate further, so that the exposure aperture is in this way determined by the cooperation of the stop means 42 with the stop means 27. Thus, the manually operable means which includes the rod 36 and the plate 84 forms a means for operating the scanning means and the drive means in such a sequence that the stop means 27 will have reached its position which is indicative of the lighting conditions before this stop means 27 is engaged by the stop means 42. It should be noted that when the stop means 42 engages the stop means 27 it acts through the stop means 27 on the scanning means so as to transmit any forces in a direction urging the scanning means back toward its rest position, so that any impact between stop means 42 and stop means 27 does not result in transmission of any stresses through the light meter pointer to the light meter. Of course, the releasable holding means 32, 34 prevents movement of the stop means 27 by the stop means 42, but it should be noted that the holding means 32, 34 is not absolutely essential to the structure of the invention since the impact with which the stop means 42 engages the stop means 27 is never great enough to cause the scanning means to turn in opposition to the spring 31 back toward its rest position.

After the exposure is made, the operator will of course release the knob 37 so that the spring 40 will now return the rod 36 to its rest position, and during the initial part of its return movement the projecting portion 38 of the rod 36 will engage the projecting portion 89 of the lever 34 to turn this lever in opposition to the spring 35 away from the teeth 32, so that the releasable holding means now releases the scanning means for return to its rest position. The continued upward movement of the rod 36 places its pin 39 in engagement with the lower edge of the lever 26 so as to turn this lever in opposition to the spring 31 back to its rest position, and of course through the pin-and-slot connection 23, 24 the U-shaped member 9 is returned to its rest position. During the return of member 9 toward its rest position, the pin 22 engages the lug 21 so as to turn the holding means 15 in opposition to the spring 19 upwardly away from the pin 7, and in this way the parts resume their original position.

In order to operate the camera in a fully manual manner the operator need only turn the ring 55 until the index 61 is aligned with the selected size of the exposure aperture on the scale 62. As has been indicated above, the cam 59 at this time will close the switch 60 so that no current flows to the light meter and of course the pointer 7 becomes aligned with the portion 14c of the scanning means. Furthermore, the stop means 57 is located closer to the projection 58 of the portion 48 of the ring 50. It is possible to provide a shutter release separate from that described above and there will be no harm even if the operator should inadvertently depress the rod 36 as explained above inasmuch as the pointer 7 is located beneath the portion 14c of the scanning means. However, it is possible to use the same rod 36 for tripping the shutter when operating the camera in a fully manual manner, and it will be noted that during depression of the rod 36 at this time the scanning means can only turn through the extremely short distance until the portion 14c engages the pointer 7. This movement is so small that the stop means 27 will be located far enough from the stop means 42 to allow the diaphragm to be moved by the spring 51 all the way from the end position where the largest aperture is provided to the end position where the smallest aperture is provided without causing the drive means to turn the stop means 42 in engagement with the stop means 27. Thus, when the shutter is released by depression of the rod 36, the spring 51 will also act to turn the ring 50 and the turning will continue until the projection 58 engages the stop means 57 so that the drive means sets the diaphragm also when the camera is operated in a fully manual manner. The bellcrank 41 is turned at this time but nothing happens since the stop means 42 cannot engage the stop means 27. Of course, when the parts are set for automatic operation the distance of the stop means 57 from the projection 48 is so great that irrespective of the position of the scanning means the stop means 42 will engage the stop means 27 before the projection 58 can engage the stop means 57. Thus, with the structure of the invention it is completely unnecessary for the operator to lock any structure against operation when changing from automatic to manual operation and vice versa. The operator need only move the diaphragm setting ring to any desired setting and the structure will operate without any possible conflict between manual and automatic structure, and in fact it will be seen that whether the camera is operated automatically or manually the operator can depress the same plunger 36 in order to make an exposure so that it is not necessary for the operator to remember different types of operation for manual and automatic operation, respectively.

The structure of the invention includes an indicating means for indicating whether or not a proper exposure can be made. In the embodiment illustrated in FIGS. 1 and 3, this indicating means includes a stationary indicating member formed by a translucent colored element 100 mounted on the field lens 101 and having, for example, a green color. In addition to the stationary indicator element 100, the indicator means includes a movable indicator element 102 which is also translucent and which has a different color, for example the color red. The movable indicator element 102 is carried by one end of a lever 105 which is supported for turning movement by a stationary pivot 103, and a spring 104 acts on the lever 105 to urge it in a counterclockwise direction, as viewed in FIG. 1. The lever 105 is in the form of a bellcrank, and it includes at its upper end, as viewed in FIG. 1, a projection engaging a stationary part of the camera to limit the turning of the lever 105 by the spring 104 to the position shown in FIG. 1. At its end distant from the movable indicator element 102 the lever 105 has a cam follower portion 106 in the form of a projection extending from the upper substantially horizontal arm of the lever 105, as viewed in FIG. 1. The upper free end portion of the lever 30 acts as a cam cooperating with the lever 105, and this cam has camming portions 107, 108, and 109. When the plunger 36 is depressed the lever 30 will of course be turned by the spring 31 in a manner described above, and the camming portion 107 will engage the portion 106 of the lever 105 so as to turn the lever 105 in a clockwise direction, as viewed in FIG. 1, and in this way the red indicator member 102 of the indicator means will be turned beyond the green indicator member 100 which is stationary, and thus the operator will see the green indicator element 100 in the viewfinder so as to know that a proper exposure can be made. As long as the camming portions 107 and 108 remain in engagement with the portion 106 of the lever 105, the red indicator member 102 is maintained beyond the green indicator 100 so that the operator receives from the indicating means the information that a proper exposure can be made. However, if the camming portion 109 reaches the portion 106 of the lever 105, the spring 104 can turn the lever 105 to such a position that the movable indicator member 102 again moves over the green indicator 100 and becomes visible to the operator indicating that a proper exposure cannot be made. When the camming portion 109 reaches the portion 106 of the lever 105 the spring 104 can return the lever 105 to the position shown in FIG. 1. These are the operations which take place if the amount of light available is so small that a proper exposure cannot be made. Under conditions where the amount of light is so great that a proper exposure cannot be made, the lever 30 is turned through such a small distance that the movable indicator 102 remains over the indicator 100 and the operator knows that a proper exposure cannot be made. As long as the camming portion 108 engages the projection 106 of the lever 105, the indicator element 102 is displaced beyond the indicator element 100 and the operator knows that a proper exposure can be made. If the camming portion 107 does not move beyond the portion 106 of the lever 105, the indicator member 102 remains over the indicator 100 and the operator knows that there is too much light for a proper exposure to be made. It should be noted that the indicator means operates according to the automatic structure. Thus, if the lighting conditons are such that the automatic structure cannot set the camera to provide a proper exposure, then the operator will see the color of the indicator 102 in the viewfinder and will know that a proper exposure cannot be made, even though it may be possible to set the camera in a fully manual manner so as to make a proper exposure under the same lighting conditions.

Of course, the indicator means of the invention is required to make an indication not only with respect to the aperture which is set by the automatic structure but also with respect to the film speed and exposure time set into the camera. Thus, for a given exposure aperture and set of lighting conditions it may well be that because of the particular film speed and the particular exposure time a proper exposure can be made or cannot be made. Thus, the influence of the exposure time and film speed on the range of exposure apertures which can be used to make a proper exposure must be introduced in order to provide for a proper indication to the operator that a proper exposure can be made. For this purpose the structure of the invention includes a lever 111 which is supported for turning movement about a stationary pivot 110, as indicated in dotted lines in FIG. 3. The curved lever 111 is located directly beneath the light meter, and in addition to its curved portion which extends beneath the light meter the lever 111 has an arm 112 extending beneath the lever 30 and this arm 112 carries a pin 113 located in an elongated slot 114 formed in the lower face of the lever 30. It will be noted from FIG. 1 that this bottom face of the lever 30 is curved along an arc of a circle whose center is in the pivot 25, so that in this way the slot 114 at all times receives the pin 113 irrespective of the angular position of the lever 30. The lower wall of the housing of the meter 3 is formed with an arcuate slot 142 shown in FIG. 3, and the lever 111 carries a pin 141 located in the slot 142. Thus, as the housing 3 turns the position of the lever 111 from that shown in FIG. 3. the end 144 of the slot 142 approaches and will eventually engage the pin 141 so as to turn the lever 111 about the pin 110. In other words, with certain combinations of exposure time and film speed the position of the cable 74 will be such that the meter 3 will turn sufficiently to alter the position of the lever 111 from that shown in FIG. 3. When the end 144 of the slot 142 engages the pin 141 to turn the lever 111, the pin 113 cooperates with the slot 114 to shift the lever 30 along its pivot 25 in a direction parallel to the optical axis. As may be seen from FIG. 3, the intersection between the camming portions 108 and 109 extends at an incline with respect to the intersection between the camming portions 107 and 108, so that the camming portion 108 is narrowest at its end nearest to the front of the camera and becomes gradually wider toward the rear of the camera. As a result, the shifting of the lever 30 in a direction parallel to the optical axis changes the point of the intersection between the camming portions 108 and 109 which cooperates with the lever 105, so that in this way the moment when the camming portion 109 will reach the portion 106 of the lever 105 can be regulated in accordance with the two factors which are manually set into the camera, these factors being in the illustrated example exposure time and film speed. Of course, the pin 29 is long enough to remain at all times in the bifurcated portion 28 of the lever 26 irrespective of the position of the lever 30 along the pivot 25. As is shown in FIG. 3, when the end 144 of the slot 142 is spaced from the pin 141, a spring 140 cooperates with the lever 111 to urge it in a clockwise direction, as viewed in FIG. 3, and at this time the lever 30 is maintained in engagement with a stationary stop member 143.

Figure 4:
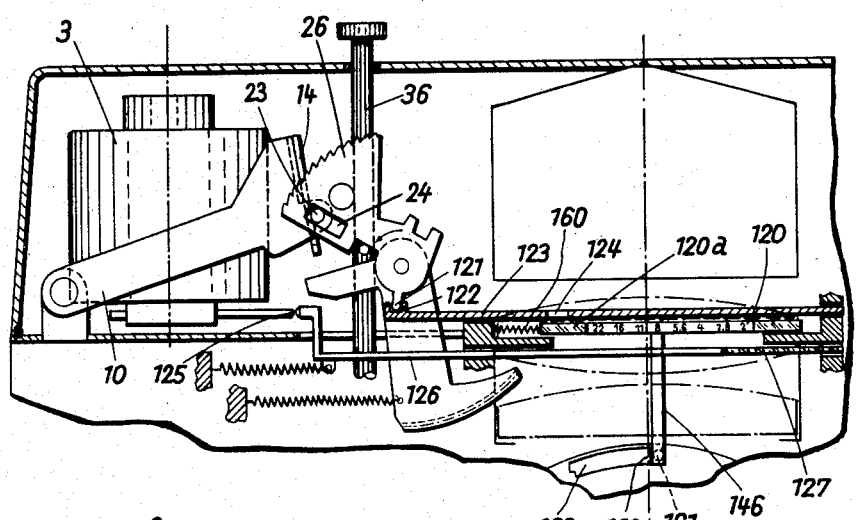
FIG. 4 is a fragmentary elevation illustrating another embodiment of a structure for indicating to the operator when a proper exposure can be made.

The indicator means of the invention may have a construction different from that shown in FIGS. 1 and 3 and described above. Thus, according to the embodiment shown in FIG. 4, a stationary indicator member 120 is provided with a scale of aperture sizes. A slide 123 is located over the scale 120 which is transparent or translucent, and the slide 123 is formed with a window 124. The lever 26 is provided with a projection 121, in the embodiment of FIG. 4, and this projection 121 extends into a channel 122 extending parallel to the optical axis and located at the upper face of the slide 123, as viewed in FIG. 4, so that during turning of the lever 26 the slide 123 will be shifted to the right, as viewed in FIG. 4, and in accordance with the position reached by the scanning means the window 124 will become located over one of the graduations of the stationary indicator member 120 so that in this way there will be indicated in the viewfinder the actual exposure aperture which has been set by the automatic structure of the camera. The slide members and indicator member 120 of FIG. 4 are located in the viewfinder structure of the camera so that the operator will see an image of the window 124 and a diaphragm setting value through the viewfinder. In accordance with the particular film speed and exposure time set into the camera, the lower limit of the scale of diaphragm values will be covered, since such diaphragm values will no longer come into use when making a proper exposure in accordance with particular settings of exposure time and film speed. Thus, the light meter 3 fixedly carries at its lower end a cam 125 which turns with the light meter 3 and which cooperates with one end of an elongated slide 127 which acts as a cover so as to cover the diaphragm values at the lower end of the scale, a spring means provided to maintain the slide 127 in engagement with the cam 125. Thus, in accordance with the particular setting of film speed and exposure time certain values of the diaphragm settings will not be able to be seen through the viewfinder even if the window 124 becomes aligned with these values, and in this way the embodiment of FIG. 4 operates to compensate for the exposure time and film speed set into the camera. In other words with the embodiments of FIGS. 1 and 3 as well as that of FIG. 4 there is an adjusting means capable of adjusting the indicating means so that it will indicate when a proper exposure can be made in accordance with the particular film speed and exposure time set into the camera, and this adjusting means in the embodiment of FIG. 4 is formed by the cover slide 127 and the cam 125, while in the embodiment of FIGS. 1 and 3, this adjusting means is formed by the lever 111 and the parts which cooperate therewith. In the embodiment of FIG. 4 the slide which cooperates with the cam 125 is indicated at 126 and it is guided by any suitable bearings for horizontal movement, and at its right end this slide 126 has the translucent red-colored portion 127 which covers the scale 120. In the same way, the end 120a of the scale 120 may also be colored red.

Figure 5:
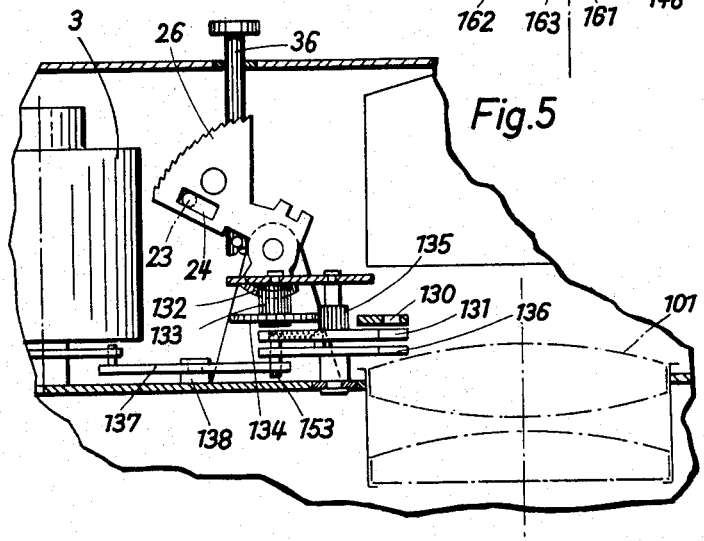
FIG. 5 is a fragmentary elevation illustrating a further embodiment of a structure for indicating to the operator when a proper exposure can be made.
Figure 8:
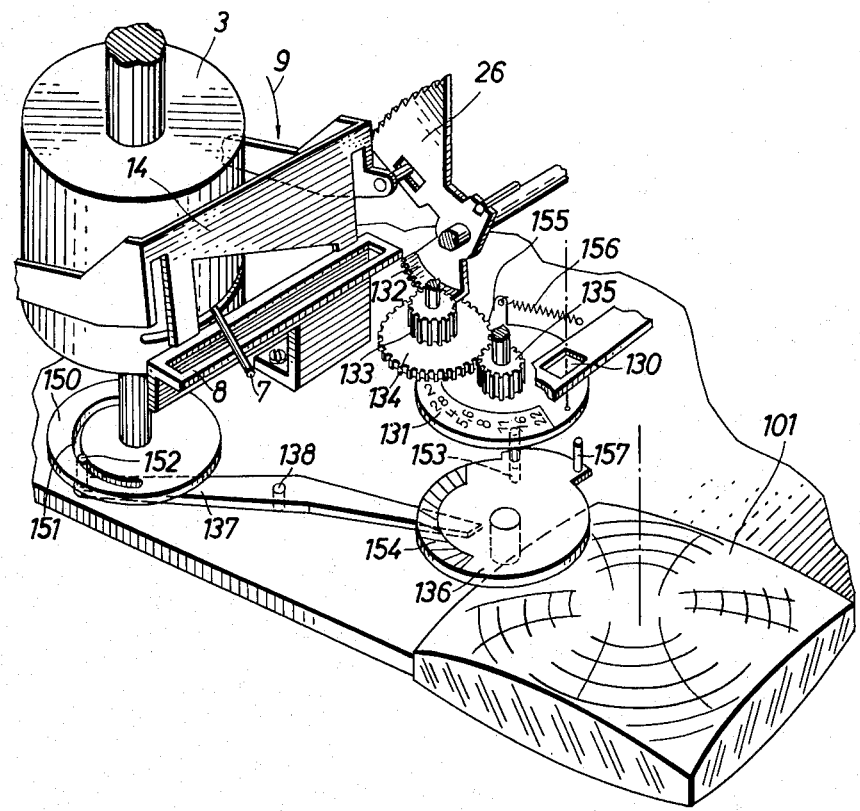
FIG. 8 is a fragmentary perspective illustration of the embodiment illustrated in FIG. 5.

FIGS. 5 and 8 show a further possible structure of an indicating means according to the invention. This embodiment includes a stationary plate formed with a window 130. The lever 26 of this embodiment has an arcuate toothed portion 132 meshing with a pinion 133 which is coaxially fixed to a gear 134, elements 133 and 134 being supported for rotary movement by any suitable pin which is stationary, and the gear 134 meshes with a gear 135 which is also supported for rotary movement and which fixedly carries a translucent member 131 having a scale of diaphragm settings, so that in accordance with the extent to which the lever 26 of the scanning means turns there will appear through the window 130 a diaphragm setting which is provided by the automatic structure. The meter 3 of FIGS. 5 and 8 carries at its underside a turnable plate 150 which is fixed to the meter 3 for turning movement therewith, and this plate is formed with a slot 151 receiving a pin 152 which is fixed to a lever 137 supported for turning movement by a stationary pivot 138, and the end of the lever 137 distant from the meter 3 can cooperate with a pin 153 which is fixed to the rotary member 136 which has a red-colored portion 154 which becomes aligned with the window 130 when the meter 3 assumes angular positions which in combination with the extent of turning of the lever 26 will not provide proper exposures. The discs 131 and 136 are coupled to each other by means of an arm 155 fixed to the translucent member 131, the pin 153 and a spring 156, one end of which is attached to the arm 155, the other end to a pin 157 fixed to the rotary member 136 so that the disc 136 follows the disc 131, until the pin 153 comes in contact with the lever 137.

In order to be able to use the embodiments of FIGS. 4 and 5 with camera capable of being provided with interchangeable objectives, the scale 120 of FIG. 4 can be shifted, and the position of the scale 120 is controlled by a projection 146 connected to the scale 120 and supporting a pin 161. The pin 161 cooperates with an edge 163 of a projection 162 of the interchangeable objective by means of a spring 160. The positions of the edges 163 of different interchangeable objectives when they are connected to the camera housing are different so that in this way the position of the pin 161 and the element 146 and thus of the scale 120 is regulated in accordance with the capabilities of the objective which happens to be connected to the camera. In the same way, with the embodiment of FIG. 5 when different objectives of different focal lengths are connected to the camera the plate which is formed with a window 130 is shifted in the same way through suitable pins, projections, or the like of the objective so that the window 130 moves in a direction perpendicular to the plane of FIG. 5 for the purpose of adapting the indicator means to the particular objective which is used.

In the above-described embodiments, the indicator means is shown in connection with the viewfinder of a single-lens reflex camera, but it is of course possible to provide the same structure in other camera where the indicator elements will have their images projected into the viewfinder.

Moreover, while in the above-described structure the diaphragm is shown as automatically controlled while a pre-selection of exposure time is made, it is of course also possible to provide a pre-selection of the diaphragm and to automatically regulate the exposure time.

FIGS. 6 and 7 respectively illustrate different embodiments of releasable holding means for releasably holding the scanning means in the position engaging the pointer of the light meter. Referring to FIG. 6 it will be seen that the lever 26 of this embodiment, instead of being provided with teeth 32, has a curved free edge 190 extending along a circle whose center is in the axis of the pivot 25. A lever 192 cooperates with the free edge 190, and this lever 192 is supported for turning movement about the stationary pivot pin 191, a spring 194 urging the lever 192 to turn in the direction of the arrow $f$. The lever 192 carries an arm 195 which cooperates with the control projection 196 which is carried by the manually operable rod 36. At its lower end the arm 195 is inclined as indicated at 197. The lever 192 has directed toward the edge 190 a free edge 193 which is curved in such a way that the end 193a of the edge 193 is nearer to the pivot pin 191 than the end 193b. Thus, when the operator depresses the plunger 36 so as to make an exposure in the manner described above, the control projection 196 will move along the arm 195, and when the rod 36 is near the end of its downward movement the projection 196 will reach the portion 197 so that the spring 194 can now turn the lever 192 in the direction of the arrow $f$. This will place the clamping edge 193 in engagement with the edge 190, so that there will be a tendency for the lever 192 to turn the lever 26 in the direction of the arrow $g$ shown in FIG. 6. However, since the curved clamping edge 193 becomes gradually more distant from the pivot 191 as this curved clamping edge 193 approaches its end 193b, the parts bind and jam and the lever 26 is reliably clamped so that it cannot turn in the direction of the arrow $g$, and in this way the releasable holding means holds the scanning means in the position where it engages the pointer of the light meter. Of course, when the rod 36 is released, it will return to the rest position shown in FIG. 6 under the influence of the return spring, and during the initial part of the return movement of the rod 36 and the control projection or pin 196 which is fixed to the rod 36 will engage the arm 195 so as to return the lever 192 in opposition to the spring 194 to the position shown in FIG. 6, and of course the clamping edge 193 will be moved away from the clamping edge 190 so that the lever 26 can now be turned to the rest position as shown in FIG. 6.

In the embodiment of the releasable holding means shown in FIG. 7, the lever 26 is also provided with a curved free edge 200 located along an arc of a circle whose center is in the turning axis of the lever 26. A stationary vertical plate 202 is formed with a curved edge 201 directed toward the free edge 200, and the curvature of the edge 201 is such that it defines with the edge 200 an elongated gap 204 which has a relatively wide end 204b and which becomes gradually narrower toward its end 204a. Located in this gap is a ball member 203 or a cylindrical roller whose diameter is greater than the width of the narrow end 204a of the gap 204 but smaller than the width of the wider end 204b of the gap 204, and a spring 213 urges the ball or roller 203 toward the narrow end 204a of the gap 204. It is apparent that with this construction the lever 206 can freely turn in a counterclockwise direction, as viewed in FIG. 7, so that the scanning means is free to turn from its rest position toward the scanning position. The upstanding plate 202, which is stationary, fixedly carries a pivot pin 205 which serves to turnably support a lever 206 which is urged to turn in the direction of the arrow $h$ by a spring 207 connected at one end to the lever 206 and at its opposite end to a stationary part of the camera. The lever 206 has an arm 208 carrying a pin 209 which engages the ball or roller 203 to maintain it, when the parts are in their position of rest, in the position shown in FIG. 7 spaced from the narrow end 204a of the gap 204, so that there is substantially no resistance to turning of the lever 206 in either direction at this time. The lever 206 carries an arm 210 which cooperates with a control projection 211 in the form of a pin fixedly carried by the plunger or rod 36, and the arm 210 has at its bottom end an inclined free end portion 212. Thus, when the rod 36 reaches the vicinity of the end of its downward movement the pin 211 will reach the elevation of the portion 212 of the arm 210 and the spring 207 will now be able to turn the lever 206 in the direction of the arrow $h$ so that the pin 209 will move away from the element 203 which will now be moved by the spring 213 toward the narrow end of the slot or gap 204, so that the spherical or roller member 203 becomes wedged between the edges 201 and 200 so as to releasably hold the lever 26 in the position which it reaches during scanning of the pointer of the light meter. It will be noted that any tendency of the lever 26 to turn at this time in the direction of the arrow $g$ will only tend to move the spherical or cylindrical member 203 further toward the narrow end 204a of the gap 204, so that the lever 26 cannot turn in this direction and the parts are reliably held in the position where the scanning edge engages the pointer of the light meter. However, during the initial part of the return movement of the rod 36 the control projection 211 engages the arm 210 to return the lever 206 in opposition to the spring 207 to the position shown in FIG. 7 so that the pin 209 displaces the ball or roller 203 toward the wider end 204b of the gap 204, and thus the lever 26 is released so that the scanning means can return to its rest position in the manner described above. It should be noted that in the lower end positions of the rods 36 of FIGS. 6 and 7 the control pins 196 and 211 never become located beyond the portions 197 and 212 of the arms 195 and 210, respectively.

When the element 203 takes the form of a cylindrical roller, the edges 201 and 200 may be considerably wider than in the case where the element 203 is in the form of a ball.

As has already been mentioned above, if the spring 31 is strong enough it is unnecessary to provide a releasable holding means to hold the scanning means in position engaging the pointer of the light meter, and even in this case because the stop means 42 engages the stop means 27 with a force which does not urge the scanning means toward the pointer undesirable shocks and stressing of the light meter will be reliably avoided.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a light meter having a movable pointer; scaning means for scanning the position of said pointer; manually-operable means cooperating with said scanning means for controlling the movement thereof into engagement with said pointer; first stop means positioned by said scanning means in a position determined by the position of the pointer scanned by said scanning means, so that the position in which said first stop means is placed by said scanning means is indicative of the light conditions; setting means for setting at least part of the structure of the camera which determines the exposure made thereby; drive means cooperating with said setting means for driving the latter from an initial end position toward a final end position; and second stop means having a rest position spaced from said first stop means and driven from said rest position by said drive means, when the latter drives said setting means from said initial toward said final end position thereof, into engagement with said first stop means, so that the extent to which said setting means is driven by said drive means is limited, in accordance with the lighting conditions, by engagement of said second stop means with said first stop means, said manually-operable means actuating said scanning means and said drive means in a sequence with locates said first stop means in said position indicative of the lighting conditions before said first stop means is engaged by said second stop means.

2. In a camera, in combination, a light meter having a movable pointer; scanning means for scanning the position of said pointer; manually-operable means cooperating with said scanning means for controlling the movement thereof into engagement with said pointer; first stop means positioned by said scanning means in a position determined by the position of the pointer scanned by said scanning means, so that the position in which said first stop means is placed by said scanning means is indicative of the lighting conditions; setting means for setting at least part of the structure of the camera which determines the exposure made thereby; drive means cooperating with said setting means for driving the latter from an initial end position toward a final end positon; and second stop means having a rest position spaced from said first stop means and driven from said rest position by said drive means, when the latter drives said setting means from said initial toward said final end position thereof, into engagement with said first stop means, so that the extent to which said setting means is driven by said drive means is limited, in accordance with the lighting conditions, by egnagement of said second stop means with said first stop means, said manually-operable means actuating said scanning means and said drive means in a sequence which locates said first stop means in said position indicative of the lighting condtions before said first stop means is engaged by said second stop means, and said second stop means, when engaging said first stop means, acting through said first stop means on said scanning means to urge the latter away from said pointer so that the engagement of said second stop means with said first stop means does not increase the force with which said scanning means engages said pointer.

3. In a camera, in combination, a light meter having a movable pointer; scanning means for scanning the position of said pointer; manually-operable means cooperating with said scanning means for controlling the movement thereof into engagement with said pointer; first stop means positioned by said scanning means in a position determined by the position of the pointer scanned by said scanning means, so that the position in which said first stop means is placed by said scanning means is indicative of the lighting conditions; setting means for setting at least part of the structure of the camera which determines the exposure made thereby; drive means cooperating with said setting means for driving the latter from an intial end position toward a final end position; second stop means having a rest position spaced from said first stop means and driven from said rest position by said drive means, when the latter drives said setting means from said initial toward said final end position thereof, into engagement with said first stop means, so that the extent to which said setting means is driven by said drive means is limited, in accordance with the lighting conditions, by engagement of said second stop means with said first stop means, said manually-operable means actuating said scanning means and said drive means in a sequence with locates said first stop means in said positon indicative of the lighting conditions before said first stop means is engaged by said second stop means, and said second stop means, when engaging said first stop means, acting through said first stop means on said scanning means to urge the latter away from said pointer so that the engagement of said second stop means with said first stop means does not increase the force with which said scanning means engages said pointer; and releasable holding means releasably holding said scanning means in engagement with said pointer in opposition to the force with which said second stop means engages said first stop means.

4. In a camera, in combination, a light meter having a movable pointer; scanning means for scanning the position of said pointer; manually-operable means cooperating with said scanning means for controlling the movement thereof into engagement with said pointer; first stop means positioned by said scanning means in a position determined by the position of the pointer scanned by said scanning means, so that the position in which said first stop means is placed by said scanning means is indicative of the lighting conditions; setting means for setting at least part of the structure of the camera which determines the exposure made thereby; drive means cooperating with said setting means for driving the latter from an initial end position toward a final end position; second stop means having a rest position spaced from said first stop means and driven from said rest position by said drive means, when the latter drives said setting means from said initial toward said final end position thereof, into engagement with said first stop means, so that the extent to which said setting means is driven by said drive means is limited, in accordance with the lighting conditions, by engagement of said second stop means with said first stop means, said manually-operable means actuating said scanning means and said drive means in a sequence which locates said first stop means in said position indicative of the lighting conditions before said first stop means is engaged by said second stop means, and said second stop means, when engaging said first stop means, acting through said first stop means on said scanning means to urge the latter away from said pointer so that the engagement of said second stop means with said first stop means does not increase the force with which said scanning means engages said pointer; releasable holding means releasably holding said scanning means in engagement with said pointer in opposition to the force with which said second stop means engages said first stop means; and means carried by said manually-operable means for releasing said holding means upon return of said manually-operable means to its predetermined rest position so that said scanning means can also return to a predetermined rest position.

5. In a camera, in combination, a light meter having a movable pointer; scanning means movable from a predetermined rest position to scan said pointer; spring means urging said scanning means from said rest position thereof to a position scanning said pointer; first stop means positioned by said scanning means in a position indicative of the lighting conditions; setting means for setting at least part of the structure of the camera which determines the exposure made thereby; drive means cooperating with said setting means for driving the same from one end position toward an opposed end position; and second stop means driven by said drive means, when the latter drives said setting means from said one toward said other end position thereof, into engagement with said first stop means, whereby said first stop means cooperates with said second stop means to limit the extent to which said drive means drives said setting means in accordance with the lighting conditions, said drive means driving said setting means through substantially its entire range of movement and said second stop means through a relatively large distance when said first stop means is moved by said scanning means through a relatively small distance upon movement of said scanning means from said rest position thereof.

6. In a camera, in combination, a light meter having a movable pointer; scanning means movable from a predetermined rest position to scan said pointer; spring means urging said scanning means from said rest position thereof to a position scanning said pointer; first stop means positioned by said scanning means in a position indicative of the lighting conditions; setting means for setting at least part of the structure of the camera which determines the exposure made thereby; drive means cooperating with said setting means for driving the same from one end position toward an opposed end position; second stop means driven by said drive means, when the latter drives said setting means from said one toward said other end position thereof, into engagement with said first stop means, whereby said first stop means cooperates with said second stop means to limit the extent to which said drive means drives said setitng means in accordance with the lighting conditions, said drive means driving said setting means through substantially its entire range of movement and said second stop means through a relatively large distance when said first stop means is moved by said scanning means through a relatively small distance upon movement of said scanning means from said rest position thereof; manually operable release means cooperating with said scanning means for holding the latter in opposition to said spring means in said rest position, whereby upon actuation of said manually-operable release means by the operator said spring means will move said scanning means from said rest position thereof; and releasable holding means releasably holding said scanning means in a position engaging said pointer, said manually-operable release means cooperating with said releasable holding means for releasing the latter from said scanning means upon return of said manually-operable release means to a predetermined rest position, so that said spring means will become tensioned and said manually-operable release means will cooperate with said scanning means to return the latter in opposition to said spring means to said rest position thereof.

7. In a camera, in combination, a light meter having a pointer; scanning means movable from a predetermined rest position for scanning said pointer, said scanning means including a rotary lever; first stop means carried by said lever for turning movement therewith, whereby said first stop means will assume positions indicative of the lighting conditions when said scanning means scans said pointer; setting means for setting at least part of the camera structure which determines the exposure made thereby; drive means cooperating with said setting means for driving the latter from an initial end position toward a final end position; second stop means having a rest position spaced from said first stop means and driven by said drive means from said rest position into engagement with said first stop means, when said drive means drives said setting means from said initial toward said final position thereof, so that said first and second stop means cooperate to limit the extent to which said drive means drives said setting means, in accordance with the lighting conditions, and means actuating said scanning means and said drive means in a sequence which locates said first stop means in a position indicative of the lighting conditions before said first stop means is engaged by said second stop means.

8. In a camera, in combination, a light meter having a movable pointer; a first scanning lever turnable about a predetermined axis and having a scanning edge which will engage said pointer upon turning of said first scanning lever from a predetermined rest position thereof; a second scanning lever turnable about an axis parallel to the axis of turning of said first lever and having a pin-and-slot connection with said first lever; first stop means carried by said second lever for turning movement therewith; setting means for setting at least part of the camera structure which determines the exposure made thereby; drive means cooperating with said setting means for driving the latter from one end position toward an opposed end position; and second stop means driven by said drive means into engagement with said first stop means, whereby said first and second stop means cooperate to limit the extent to which said drive means drives said setting means.

9. In a camera, in combination, a light meter having a movable pointer; a first scanning lever turnable about a predetermined axis and having a scanning edge which will engage said pointer upon turning of said first scanning lever from a predetermined rest position thereof; a second scanning lever turnable about an axis parallel to the axis of turning of said first lever and having a pin-and-slot connection with said first lever; first stop means carried by said second lever for turning movement therewith; setting means for setting at least part of the camera structure which determines the exposures made thereby; drive means cooperating with said setting means for driving the latter from one end position toward an opposed end position; and second stop means driven by said drive means into engagement with said first stop means, whereby said first and second stop means cooperate to limit the extent to which said drive means drives said setting means, said second stop means being turnable about the axis of turning of said second lever and said drive maens driving said second stop means about the axis of turning of said second lever in a direction opposite to the direction of turning of said second lever during movement of said scanning edge of said first lever toward said pointer.

10. In a camera, in combination, a light meter having a movable pointer; scanning means for scanning said pointer, said scanning means being movable from a predetermined rest position to a position engaging said pointer and said scanning means having a toothed portion; spring means cooperating with said scanning means for moving the same from said rest position to a position engaging said pointer, whereby said toothed portion moves with said scanning means; a pawl cooperating with said toothed portion of said scanning means for maintaining the latter in a position engaging said pointer; and manually operable means cooperating with said scanning means for yieldably maintaining the same in said rest position and for releasing said scanning means to said spring means, said manually operable means having a pawl-controlling portion cooperating with said pawl for maintaining the latter out of engagement with said toothed portion during movement of said scanning means to and from said rest position thereof.

11. In a camera, in combination, a light meter having a pointer; scanning means for scanning said pointer, said scanning means having a rest position and including a turnable member having a curved edge; releasable holding means having a holding position engaging said curved edge of said scanning means for holding said scanning means in engagement with said pointer and preventing movement of said scanning means from said pointer; and manually operable means controlling movement of said scanning means to and from said pointer, said manually operable means being movable by the operator from a rest position to an operating position and in the region of said rest position engaging said holding means for maintaining the latter in a release position releasing said curved edge to free said scanning means for movement toward and away from said pointer, said manually operable means when in the region of said operating position thereof freeing said holding means for movement to said holding position thereof.

12. In a camera, in combination, a light meter having a movable pointer; scanning means cooperating with said pointer, said scanning means being movable from a rest position toward said pointer and including a turnable member having a free edge portion; engaging means engaging said free edge portion for releasably holding said scanning means in a position engaging said pointer and preventing movement of said scanning means away from said pointer, said engaging means including a turnable lever and a spring acting on said lever to place said engaging means in a position engaging said edge; a manually-operable member cooperating with said scanning means for controlling the movement thereof; a return spring stronger than said spring which acts on said lever of said engaging means and cooperating with said manually-operable member for urging the latter and said scanning means therewith to a predetermined rest position where said scanning means is out of engagement with said pointer; and means carried by said manually-operable member and cooperating with said lever of said engaging means for turning the same, during return of said manually-operable member to said rest position thereof, in opposition to the spring which acts on said lever to a position where said engaging means does not engage said free edge portion.

13. In a camera as recited in claim 12, said free edge portion being toothed and said lever of said engaging means being a pawl.

14. In a camera as recited in claim 12, said free edge portion being curved and said lever of said engaging means having a curved edge cooperating with said curved free edge portion of said scanning means to prevent movement thereof.

15. In a camera as recited in claim 12, said free edge portion of said scanning means being curved and said engaging means including a rotary member engaging said curved free edge portion of said scanning means, said engaging means also including a stationary member having an edge directed toward said free edge portion and defining a tapered gap therewith, said rotary member located in said gap so that upon moving toward the narrow end thereof said scanning means will be clamped, and said lever of said engaging means cooperating with said rotary member to free the latter for movement toward the narrow end of said gap when said scanning means engages the pointer, said engaging means including a spring urging said rotary member toward said narrow end of said gap.

16. In a camera, in combination, a light meter having a pointer movable in a predetermined plane; a support member having a supporting surface located in a plane parallel to and closely adjacent to the plane of movement of said pointer so that said surface limits the deflection of said pointer from said plane of movement thereof; scanning means for scanning said pointer; holding means for holding said pointer against said surface; and spring means cooperating with said holding means for urging the same to a position engaging said pointer to hold the latter against said surface, said scanning means cooperating with said holding means for moving the latter in opposition to said spring means away from said pointer when said scanning means is moved from a scanning position to a predetermined rest position and said scanning means controlling the movement of said holding means by said spring means to place said holding means in engagement with said pointer prior to engagement of said scanning means with said pointer during movement of said scanning means toward said pointer to scan the same.

17. In a camera, in combination, setting means for setting at least part of the structure of the camera which determines the exposure made thereby, said setting means being movable from one end position toward an opposed end position and when located in said one end position providing an exposure according to predetermined lighting conditions; drive means cooperating with said setting means for driving the same from said one toward the other of the end positions thereof; a light meter having a movable pointer; scanning means cooperating with said pointer for scanning the same, said scanning means having a scanning edge opposite ends of which are located at different distances from a plane in which said pointer moves and said edge gradually progressing between said opposite ends thereof, said pointer when the lighting conditions correspond to those for said setting means at said one end position thereof being located in alignment with the region of said edge at the end thereof most distant from said plane, so that under the lighting conditions appropriate for location of said setting means at said one end position thereof said scanning means will move through the greatest distance before said scanning edge engages said pointer; first stop means connected to said scanning means to be moved thereby to a predetermined position according to the lighting conditions; and second stop means moved by said drive means during driving of said setting means from said one end position thereof toward said other end position thereof, whereby under the lighting conditions appropriate for location of said setting means in the region of said one end position thereof said first stop means will move through a relatively large distance to limit the movement of said second stop means to a relatively small movement so that said drive means will drive said setting means through a relatively small distance, if any, from said one end position thereof.

18. In a camera, in combination, setting means for setting at least part of the structure of the camera which determines the exposure made thereby, said setting means having one end position corresponding to lighting conditions where a minimum amount of light is available and being movable from said one end position toward an opposed end position for making exposures with amounts of light substantially greater than the minimum amount of light appropriate for said setting means in said one end position thereof; drive means cooperating with said setting means for driving the same from said one to said other end position; a light meter having a movable pointer; scanning means for scanning said pointer and including a scanning edge opposed ends of which are respectively located at different distances from a plane in which said pointer moves, said pointer under minimum lighting conditions being located in alignment with that end of said edge which is most distant from said plane; first stop means carried by said scanning means to be moved thereby to a position in accordance with the lighting conditions, whereby under minimum lighting conditions said first stop means will be moved through a relatively large distance; and second stop means driven by said drive means toward said first stop means to engage the latter for limiting the extent of movement of said setting means by said drive means, whereby under minimum lighting conditions said first stop means will be located relatively close to said second stop means to provide only a relatively small amount of movement, if any, of said second stop means under minimum lighting conditions.

19. In a camera, in combination, a pair of setting means for respectively setting the exposure time and the exposure aperture of the camera, one of said setting means being automatic and the other being manual; light meter means having a movable pointer; support means supporting said light meter means for rotary movement; cable means connecting the said manual setting means to said light meter means for turning the latter to an angular position according to the setting of said manual setting means; pulley means including a plurality of pulleys and guiding said cable means between said light meter means and manual setting means; means for introducing an exposure-influencing factor other than exposure time and aperture, said latter means including a turnable lever which turns to an angular position corresponding to said exposure-influencing factor and said lever carrying a pulley of said pulley means and acting through said cable means on said meter means to turn the latter to an angular position according to said factor; drive means cooperating with said automatic setting means for driving the latter; and means cooperating with said pointer and said drive means for limiting the extent to which the latter drives said automatic means in accordance with the lighting conditions.

20. In a camera, in combination, a light meter having a pointer; scanning means movable from a predetermined rest position for scanning said pointer; first stop means carried by said scanning means to be moved thereby to positions indicative of the lighting conditions; setting means for setting at least part of the structure of the camera which determines the exposure made thereby, said setting means being movable from one end position toward an opposed end position; drive means cooperating with said setting means for driving the same from said one toward said other end position thereof; second stop means driven by said drive means toward said first stop means so that said first and second stop means cooperate to limit the extent to which said drive means drives said setting means in accordance with the lighting conditions, said first and second stop means being located at a maximum distance from each other when said scanning means is in said rest position thereof and said setting means is in said one end position thereof; manually-operable means for manually setting the same structure which is set by said setting means, said manually-operable means having a predetermined automatic position when the extent to which said setting means is driven by said drive means is automatically determined; and third stop means located in the path of movement of a portion of said drive means and connected to said manually-operable means to be positioned thereby, said manually-operable means positioning said third stop means beyond the range of movement of said portion of said drive means when said manually-operable means is in said automatic position thereof and when said manually-operable means is manually placed in a position providing preselected manual settings of the camera said manually-operable means placing said third stop means in a position located closer to said portion of said drive means than the distance between said first and second stop means, so that said portion of said drive means will engage said third stop means to determine in a manual manner the extent to which said drive means drives said setting means, whereby the camera may be operated either automatically or manually without locking any structure against operation.

21. In a camera, in combination, a pair of setting means for respectively setting the exposure aperture and the exposure time of the camera, one of said setting means being automatically operable and the other of said setting means being manually operable; a pair of indicating means movable one with respect to the other for the indicating when the camera can make a proper exposure and when the camera cannot make a proper exposure; and means operatively connecting said manually operable setting means to one of said indicating means for placing the latter in a position cooperating with the other of said indicating means for indicating when a proper exposure can be made in accordance with the manual setting of said manually operable setting means.

22. In a camera, in combination, automatic setting means and manual setting means, one of said setting means setting the exposure time of the camera and the other of said setting means setting the exposure aperture of the camera; automatic means cooperating with said automatic setting means for automatically setting the latter; indicating means actuated by said automatic means for indicating when a proper exposure can be made; and adjusting means actuated by said manual setting means and cooperating with said indicating means for adjusting the latter to indicate when a proper exposure can be made according to the manual setting of said manual setting means.

23. In a camera, in combination, automatic setting means and manual setting means, one of said setting means setting the exposure time of the camera and the other of said setting means setting the exposure aperture of the camera; automatic means cooperating with said automatic setting means for automatically setting the latter; indicating means actuated by said automatic means for indicating when a proper exposure can be made; and adjusting means actuated by said manual setting means and cooperating with said indicating means for adjusting the latter to indicate when a proper exposure can be made according to the manual setting of said manual setting means, said indicating means including a stationary indicating member and a movable indicating member moved by said automatic means and cooperating with said stationary indicating member for indicating when a proper exposure can be made, said adjusting means cooperating with one of said indicating members for adjusting the latter in accordance with the manual setting of said manual setting means.

24. In a camera, in combination, automatic setting means and manual setting means, one of said setting means setting the exposure aperture and the other of said setting means setting the exposure time; a rotary light meter; automatic means cooperating with said light meter and said automatic setting means for automatically setting the latter in accordance with the lighting conditions; motion-transmitting means transmitting movement of said manual setting means to said light meter to turn the latter for influencing said automatic means in accordance with the manual setting of said manual setting means; indicating means actuated by said automatic means for indicating when a proper exposure can be made; and adjusting means actuated by said light meter upon turning movement thereof by said manual setting means and adjusting said indicating means to indicate when the proper exposure can be made in accordance with the manual setting of said manual setting means.

25. In a camera, in combination, automatic setting means and manual setting means, one of said setting means setting the exposure time and the other of said setting means setting the exposure aperture; rotary light meter means; automatic means cooperating with said light meter means and said automatic setting means for automatically setting the latter in accordance with the lighting conditions; motion-transmitting means connecting said manual setting means to said light meter means for turning the latter in accordance with the setting of said manual setting means; a stationary translucent indicator of a first color; a movable translucent indicator of a second color cooperating with said first color for indicating when a proper exposure can be made; moving means cooperating with said movable indicator for moving the same with respect to said stationary indicator, said moving means being actuated by said automatic means for placing said movable indicator in a position with respect to said stationary indicator indicating when a proper exposure can be made; and means cooperating with said light meter means and said moving means for placing the latter in a position with respect to said automatic means which will influence the movement of said movable indicator according to the setting of said manual setting means.

26. In a camera, in combination, automatic setting means and manual setting means, one of said setting means setting the exposure time and the other of said setting means setting the exposure aperture; rotary light meter means; automatic means cooperating with said light meter means and with said automatic setting means for setting the latter in accordance with the lighting conditions; motion-transmitting means cooperating with said manual setting means and said light meter means for turning the latter to take into account the manual setting of said manual setting means; a stationary translucent indicator of a first color; a movable translucent indicator of a second color cooperating with said stationary indicator to indicate when a proper exposure can be made; a turnable lever carrying said movable indicator and having a cam follower portion; and cam means turnable about a predetermined axis and cooperating with said cam follower portion of said lever for turning the latter to position said second indicator with respect to said first indicator to indicate whether or not a proper exposure can be made, said cam means being actuated by said automatic means and having a camming portion which changes along the axis of turning of said cam means, said rotary meter means being operatively connected to said cam means for shifting the latter axially so as to influence the position of said second indicator according to the manual setting of said manual setting means.

27. In a camera as recited in claim 21, one of said pair of indicating means including a stationary scale having graduations corresponding to the settings provided by said automatic setting means and a first slide member movable with respect to said stationary scale and formed with a window through which graduations of said scale are visible; automatic means cooperating with said automatically operable setting means for automatically setting the latter and cooperating with said first slide member for moving the latter to place said window thereof in alignment with the graduation corresponding to the setting of said automatically operable setting means, and the other of said pair of indicating means including a second slide member slidable with respect to said stationary scale for covering graduations thereof, said manually operable setting means cooperating with said second slide member for moving the latter to positions covering those graduations of said scale which will not provide a proper exposure in accordance with the manual setting of said manual setting means.

28. In a camera as recited in claim 27, means controlling the position of said scale in accordance with the focal length of the objective carried by the camera.

29. In a camera as recited in claim 21, rotary light meter means; automatic means cooperating with said light meter means and said automatically operable setting means for automatically setting the latter according to the lighting conditions, one of said pair of indicating means including a plate formed with a window and movable scale means carrying graduations of the settings set by said automatic setting means and movable with respect to said plate so that the graduations of said scale are visible through said window; means moving said scale means upon movement of said automatic means to rotate in alignment with said window a graduation corresponding to the setting of said automatic means, the other of said pair of indicating means including a cover means cooperating with said scale for covering graduations thereof, said cover means being actuated by said meter means for covering graduations of said scale in accordance with the setting of said manually operable setting means, said manually operable setting means being operatively connected to said meter means for turning the latter in accordance with the manually operable setting of said manual setting means.

30. In a camera as recited in claim 29, means for positioning said plate in accordance with the focal length of the objective of the camera.

31. In a single-lens reflex camera, in combination, automatic setting means and manual setting means, one of said setting means setting the exposure time and the other of said setting means setting the exposure aperture; automatic means cooperating with said automatic setting means for setting the latter in accordance with the lighting conditions; viewfinder means; indicating means in said viewfinder means for indicating in the latter when a proper exposure can be made, said indicating means being actuated by said automatic means; and adjusting means cooperating with said indicating means for adjusting the latter, said adjusting means being actuated by said manual setting means for adjusting said indicating means in accordance with the manual setting of said manual setting means.

32. In a camera, in combination, manual setting means and automatic setting means, one of said setting means setting the exposure time and the other of said setting means setting the exposure aperture; automatic means cooperating with said automatic setting means for automatically setting the latter; viewfinder means; indicator means for indicating when a proper exposure can be made; means rendering said indicator means visible in said viewfinder means; means actuating said indicator means from said automatic means for indicating when a proper exposure can be made; and adjusting means cooperating with said indicating means for adjusting the latter, said adjusting means actuated by said manual setting means for adjusting said indicating means in accordance with said manual setting of said manual setting means.

33. In a camera, in combination, manual means for setting the factor of the speed of the film used in the camera into the latter; manually operable exposure time setting means; automatic diaphragm setting means; automatic means cooperating with said automatic diaphragm setting means for setting the latter; a scale of exposure apertures; indicating means actuated by said automatic means for cooperating with said scale to indicate the setting of the diaphragm; and means actuated by said exposure time setting means for adjusting said indicating means in accordance with the setting of the exposure time to indicate when a proper exposure can be made.

34. In a camera, in combination, three setting means for setting into the camera three factors, namely, film speed, exposure time, and exposure aperture; automatic means cooperating with one of said setting means for setting the latter in accordance with the lighting conditions, said automatic means being influenced by the setting of the other two setting means; indicating means actuated by said automatic means for indicating when a proper exposure can be made; and adjusting means actuated by said other two setting means and cooperating with said indicating means for adjusting the latter to indicate when a proper exposure can be made in accordance with the settings of said other two setting means.

References Cited in the file of this patent

UNITED STATES PATENTS

| | | |
|---|---|---|
| 2,940,046 | Herterich | June 7, 1960 |
| 2,969,004 | Gebele | Jan. 24, 1961 |
| 2,996,968 | Lunzer | Aug. 22, 1961 |
| 3,000,282 | Noack | Sept. 19, 1961 |
| 3,005,390 | Hahn | Oct. 24, 1961 |